United States Patent [19]

O'Brien

[11] Patent Number: 4,647,609
[45] Date of Patent: Mar. 3, 1987

[54] LOW WEAR POLYACETAL WITH ANTISTATIC PROPERTIES

[75] Inventor: David P. O'Brien, Plainfield, N.J.

[73] Assignee: Celanese Corporation, New York, N.Y.

[21] Appl. No.: 791,386

[22] Filed: Oct. 25, 1985

[51] Int. Cl.[4] .......................... C08K 5/54; C08L 61/02
[52] U.S. Cl. .................................... 524/267; 524/317; 524/318; 525/398
[58] Field of Search ................ 525/398, 474; 524/317, 524/320, 542, 910, 267, 318, 322; 260/DIG. 15, DIG. 17

[56] References Cited

U.S. PATENT DOCUMENTS

| | | | |
|---|---|---|---|
| 3,027,352 | 3/1962 | Walling | 528/241 |
| 3,445,433 | 5/1969 | McAndrew | 528/241 |
| 4,274,986 | 6/1981 | Ikenaga et al. | 524/910 |
| 4,472,556 | 9/1984 | Lipowitz et al. | 525/106 |

Primary Examiner—Theodore E. Pertilla
Attorney, Agent, or Firm—Depaoli & O'Brien

[57] ABSTRACT

An antistatic polyacetal resin composition is provided with vastly improved wear properties by the inclusion of small amounts of a polydiorganosiloxane. The polyacetal resin composition is provided with an antistatic agent comprising a polyol fatty acid ester such as glyceryl monostearate and a glycol ether or ester such as polyethylene glycol.

26 Claims, 1 Drawing Figure

TIME TO WEAR FAILURE FOR POLYACETAL RESINS WEARING AGAINST STEEL AT 50PSI AND 300FPM

* Test terminated, sample unfailed

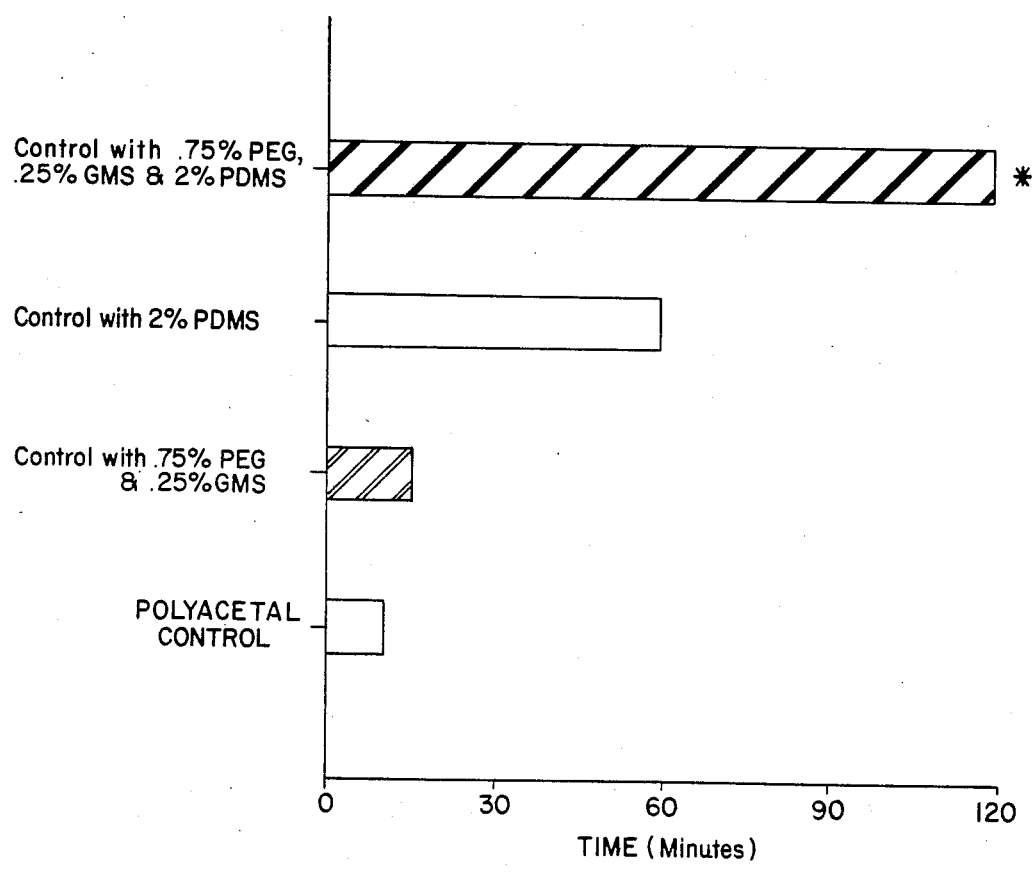

LOW WEAR POLYACETAL WITH ANTISTATIC PROPERTIES

BACKGROUND OF THE INVENTION

This invention relates to polyacetal resin compositions and molded articles made therefrom having improved wear properties. In particular, the invention is concerned with molded articles made from a novel polyacetal resin composition useful in low wear applications such as for the replacement of metals or in improving plastic to metal wear performance.

Polyoxymethylene polymers having recurring —CH$_2$O— units, have been known for many years. These polymers may be prepared by the polymerization of anhydrous formaldehyde or by the polymerization of trioxane, which is a cyclic trimer of formaldehyde. Also known is the preparation of oxymethylene copolymers by copolymerizing trioxane with cyclic ethers such as dioxolane. These copolymers are also used as molding resins, U.S. Pat. No. 3,027,352. Polyacetal terpolymers such as formed by polymerizing a blend comprising a major amount of trioxane, a small amount of a polyfunctional epoxy-containing compound having two copolymerizably reactive groups such as butanediol diglycidyl ether and a minor amount of ethylene oxide, U.S. Pat. No. 3,445,433 are also known and have use as molding compositions.

Present state of the art concerns have been to impart desired physical properties to polyacetal resins by inclusion of additives. For example, small amounts, e.g. less than 1 wt. %, of each polyethylene glycol and glyceryl monostearate have been shown to impart antistatic properties to polyacetal resins without excessive waxy bleeding on the surface of the molded article, excessive lubrication, discoloration, and reduction in thermal stability which often results upon addition of antistatic agents, U.S. Pat. No. 4,274,986. This reference is herein incorporated by reference. Polydimethylsiloxane addition has been shown to improve the wear properties of polyacetal resins, U.S. Pat. No. 4,472,556. Melt flow properties of oxymethylene polymers have been improved by addition of silicon oil, U.S. Pat. No. 3,491,048.

It is an object of the present invention to improve the wear properties of oxymethylene polymers, in particular, oxymethylene polymers with antistatic properties and render such polymers useful in the molding of component parts as replacements for metal components or for component plastics where plastic to metal and plastic to plastic wear properties are important.

SUMMARY OF THE INVENTION

The present invention is based on the discovery that by adding small amounts of polydiorganosiloxane to oxymethylene polymers having contained therein antistatic agents and, in particular, the antistatic agents set out in aforementioned U.S. Pat. No. 4,274,986, vastly improved and unexpected wear properties are imparted to the polymer.

BRIEF DESCRIPTION OF THE DRAWING

The Figure is a graph depicting the results of a time to wear failure study of polyoxymethylene polymers within and without the scope of the present invention.

PREFERRED EMBODIMENTS

The oxymethylene polymers with which this invention is concerned may be prepared by the polymerization of anhydrous formaldehyde or trioxane or alternatively by the copolymerization of formaldehyde or trioxane with cyclic ethers having at least two adjacent carbon atoms. In general, the cyclic ethers which may be used are of the formula

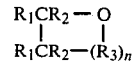

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene and lower alkyl and haloalkyl substituted oxymethylene radicals and n is an integer from 0 to 3.

The preferred cyclic ethers which may be used in the preparation of the desired copolymers are ethylene oxide and 1,3 dioxolane which may be designated by the formula

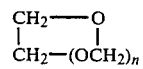

where n is an integer from 0 to 2. Other cyclic ethers which may be used are 1,4 dioxane, trimethylene oxide, tetramethylene oxide, pentamethylene oxide, 1,2 propylene oxide, 1,2 butylene oxide, 1,3 butylene oxide and 2,2 di(chloromethyl) 1,3 propylene oxide.

Preferably the copolymer will contain at least 60 mole percent of recurring oxymethylene units, most preferably from about 85 to about 99.9 mole percent of recurring oxymethylene units and from about 0.1 to about 15 mole percent of oxyalkylene units, having at least two adjacent carbon atoms as derived from said cyclic ether. A preferred copolymer comprises 98–98.5 mole % trioxane and 1.5–2 mole % 1,3 dioxolane or ethylene oxide.

The oxymethylene terpolymers are also useful in this invention and may be produced by the terpolymerization of trioxane with one of the above described cyclic ethers and the polyepoxides or diformals of British Pat. No. 1,026,777, i.e., butanediol diglycidyl ether, the disclosure of which is hereby incorporated by reference.

The monomers are polymerized in the presence of Lewis acid polymerization catalysts which are those known in the art for the copolymerization of trioxane with cyclic ethers. Typical of such Lewis acid polymerization catalysts are boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, phosphorous trichloride, titanium tetrachloride, ferric chloride, zirconium tetrachloride, aluminum trichloride, stannic chloride and stannous chloride and compounds containing these materials such as boron trifluoride coordinate complexes with organic compounds, particularly those in which oxygen or sulfur is a donor atom such as alcohols, phenol, an acid, an ether, an acid anhydride, an ester, a ketone, an aldehyde, a dialkyl sulfide or a mercaptan.

An alternative method of forming the oxymethylene polymers of the present invention is by performing the polymerization or copolymerization of trioxane with the cyclic ethers with the above Lewis acid polymerization catalyst in the presence of a small amount of a non-acidic organo tin compound having at least one direct chemical bond from a tin atom to an atom selected from the group consisting of oxygen and sulfur as set forth in U.S. Pat. No. 3,862,090.

The non-acidic organo tin compounds with which this invention is concerned are those which contain at least one direct chemical bond from said tin atom to an atom selected from the group consisting of oxygen and sulfur. By direct chemical bond is meant that the bond from said tin atom to said oxygen or sulfur atom is one which satisfies a primary valence of said tin atom and said oxygen or sulfur atom. Thusly, organo tin compounds which do not contain such a direct chemical bond from said tin atom to said oxygen or sulfur atom, but which are coordinate complexes between said tin atom and said oxygen or sulfur atoms are not included within the definition of organo tin compounds having at least one direct chemical bond from said tin atom to an atom selected from the group consisting of oxygen and sulfur.

Typical of the non-acidic organo tin compounds which contain at least one direct chemical bond from said tin atom to an atom selected from the group consisting of oxygen and sulfur which may be used according to the instant invention are:

A. Tetravalent tin compounds:

trimethyltin acetate, di-n-butyltin diacetate, tri-n-butyltin acetate, dimethyltin maleate, di-n-butyltin maleate, di-n-butyltin dilaurate, di-n-butyltin distearate, di-n-butyltin salicylate, diethyltin dibenzoate, diethyltin bis(monolauryl phthalate), di-n-butyltin dicinnamate, di-n-butyltin oxide, di-n-butyltin oxylaurate, di-n-butyltin monomethoxymonoacetate, di-n-butyltin dimethoxide, di-n-butyltin monoacetyl monolauryl mercaptide, di-n-butyltin bis(mono-β-hydroxyethyl maleate), di-n-butyltin bis(monoethylmaleate) di-n-butyltin monomethyoxymethyl maleate, di-n-butyltin dimethacrylate, diethyltin bis(mono-β-hydroxyethylthioglycolate), di-n-butyltin dibutylthioglycolate, di-n-butyltin bisoctylthiopropionate, di-n-butyltin bis-β-chloroethylthioglycolate, di-n-hexyltin bis(tetrahydrofurfuryl) thioglycolate, di-n-butyltin sulfide, di-n-butyltin diepoxyoleate, di-n-butyltin dimethyldithiocarbamate, bis(tr8-n-butyltin)oxide, bis(tributyltin)sulfide.

B. Divalent tin compounds:

stannous formate, stannous acetate, stannous propionate, stannous butyrate, stannous octoate, stannous stearate, stannous benzoate, stannous sulfide, compounds of divalent tin with 2,6-ditertiary-butylphenols or thiophenols, stannous mercaptide, stannous oxide, stannous laurate and the like.

Preferred of these non-acidic organo tin compounds are those which contain at least one direct chemical bond from the tin atom to an oxygen atom, and most preferred are the tin carboxylates.

The polymerization of trioxane or the copolymerization of trioxane and cyclic ether is conducted at a temperature of from about 50° C. to about 90° C., preferably from about 60° C. to about 80° C. If the Lewis acid polymerization catalyst is used alone, it is typically used in amounts from about 20 to about 100 parts per million (ppm), preferably from about 30 to 70 (ppm) based on the weight of trioxane. If in addition to the Lewis acid polymerization catalyst, the non-acidic organo tin compound is used, such compound is used in amounts of from about 50 to 500 (ppm), preferably from about 60 to 250 (ppm), based on the combined weights of comonomers.

In accordance with this invention, the wear properties of oxymethylene polymers having antistatic properties are improved by the addition of a polydiorganosiloxane. Polyoxymethylene polymers having antistatic properties useful in this invention are those polymer compositions comprising an oxymethylene polymer or copolymer having contained therein a separate antistatic agent, such as a polyhydric alcohol fatty acid ester. Preferred antistatic polyacetal resins are set out in aforementioned U.S. Pat. No. 4,274,986. It was found that when the concentration of poolyhydric alcohol ester type antistatic agent is reduced and a polyethylene glycol having relatively low antistatic characteristics, is added in its place a synergistic effect is manifested. The synergistic effect is to moderate excessive bleeding, excessive lubrication, discoloration and reduction in stability without substantial reduction of the antistatic effect. In accordance with the invention therein, a composiion is provided in which a polyhydric alcohol fatty acid ester having a hydroxyl group, which is prepared from a fatty acid and a polyhydric alcohol, and a polyethylene glycol are incorporated into polyacetal resins.

It has now been found that the addition of polydiorganosiloxane to a polyacetal resin having contained therein an antistatic composition of a polyhydric alcohol fatty acid ester polyethylene glycol improves the wear properties of the polyacetal resin beyond what would be expected from results obtained by separate addition of the components.

By the term, a polyhydric alcohol fatty acid ester having a hydroxyl group is meant alcohol fatty acid esters having at least one hydroxyl group and at least one ester group, obtained by reaction between natural or synthetic fatty acids such as lauric acid, myristic acid, palmitic acid, stearic acid, arachic behenic acid, oleic acid, hydroxylstearic acid and alkali and transition metal salts thereof, and polyhydric alcohols having at least three hydroxyl groups such as glycerin, pentaerythritol, diglycerin and sorbitol. All of these esters are commercially available antistatic agents. In general, the sole use of monoglycerides of stearic acid, palmitic acid and the like not preferred because conspicuous solid bleeding results. When these monoglycerides are used in combination with polyethylene glycols, bleeding is effectively controlled without a detrimental effect on the monoglyceride's antistatic property. Monoglycerides are advantageously employed because monoglycerides can be purified by distillation with resultant availability of a highly pure product.

Other useful antistatic agents include polyol fatty acid esters, generally, and aliphatic ethers of polyhydric alcohols containing at least at leaet one free hydroxyl group wherein the polyol reactant contains at least three hydroxyl groups.

The polyethylene glycol component includes liquid products having relatively low molecular weight as well as solid products having high molecular weights. They have little antistatic properties and thus none of them can be used singly as antistatic agents. However, when they are used in combination with ester type antistatic agents, as in the present invention, remarkably improved antistatic effects are attained by the synergistic action of the two components. In general, the antistatic effect is reduced with increase of the molecular weight of the polyethylene glycol. Accordingly, it is preferred that the molecular weight be no higher than 20,000, more preferably not higher than 10,000. From the viewpoint of antistatic propensity, the lower limit of molecular weight is not critical. However, since a polyethylene glycol having an excessively low molecular weight is easily vaporized, it is preferred that its molecular weight be at least 400. Use of a polyethylene glycol having a molecular weight of at least 1000 is especially preferred because liquid bleeding is eliminated.

In place of polyethylene glycol other glycol ethers and fatty acid esters can be utilized including polypropylene glycol, copolymers of polyethylene glycol with other alkylene glycols, e.g., propylene glycol; fatty acid esters of alkylene glycols, e.g., ethylene glycol stearate, and fatty acid esters of polyalkyl glycols.

The relative concentration of the two components, the polyethylene glycol or other equivalent glycols and polyol fatty acid esters, in the polyacetal composition influences the composition's antistatic property, surface characteristics, stability, moisture-absorbing property and mechanical properties. Since the required degree of the antistatic property, the allowable range of bleeding and the allowable degree of reduction of physical properties varies depending on the polyacetal composition's intended use, the amounts of these additives is adjusted according to the intended use. In many applications, a sufficient antistatic effect is attained if the fatty acid ester content is at least 0.1% and the total content of the fatty acid ester and polyethylene glycol is at least 1%. However, in some applications, a satisfactory antistatic effect is obtained even if the concentration of these additives are even lower. In case of substances that are likely to cause solid bleeding, such as glyceryl monostearate, bleeding can be prevented if the concentration of such substance is reduced below 1%. Thus, the amount of the glycol ether or ester component will comprise 0.50 to 1.4 wt. % and preferably 0.6–0.9% by weight and the polyhydric alcohol fatty acid ester will be present in amounts of about 0.1 to 1% and preferably 0.1–0.4 wt. %.

The polydiorganosiloxane polymers useful as additives to the antistatic polyacetal of this invention will have the following structural formula:

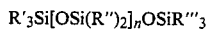

wherein R', R", R''' can be the same or different and selected from alkyl, phenyl, or substituted phenyl and n is an integer from 1 to 100. Viscosity of the polydiorganosiloxane may range from about 1,000 to 100,000 centistokes at 77° F. (25° C.). The preferred polydiorganosiloxane is polydimethylsiloxane. The polydiorganosiloxane polymer may be present in amounts of about 1.5–3% and preferably 1.8–2.2% by weight of the polyacetal resin.

The composition of the present invention can be prepared by an ordinary mixer such as a ordinary extruder. A well-dispersed composition prepared by using a mixing apparatus having a high capacity, such as a biaxial extruder, is especially preferred because moldability and antistatic property of polyacetal so prepared are especially enhanced when they are prepared in this manner. The biaxial extruder is advantageously employed for incorporating a low-viscosity substance such as mineral oil or lubricants along with the additives of the present invention. The antistatic agents and polydiorganosiloxane may be preliminarily molten and mixed, or they may be incorporated into the polyacetal prior to kneading in an extruder or the like or they may be directly fed in the liquid state into an extruder or the like.

Various additives, for example, amidines, polyamides, metal soaps, bisphenol-type, ester-type, or hindered phenol-type antioxidants, and other stabilizers may be incorporated into these polyacetals. Furthermore, reinforcers, fillers, and coloring pigments such as glass, talc, white mica, gold mica, and carbon, and polymeric substances such as polyurethanes, ethylene vinyl acetate, other rubbers and thermal plastic resins, may be incorporated into the polyacetals.

As will be seen by the following example, that while known to increase the wear properties of oxymethylene polymers, polydiorganosiloxane when added to an antistatic polyoxymethylene polymer yields results which are quite unexpected from what the additives themselves would suggest.

The following Example illustrates the improvement in wear properties which is obtained by incorporating the additives of the present invention into polyoxymethylene polymers.

EXAMPLE

The comparative wear properties of an acetal copolymer (Celcon M270 manufactured by Celanese Corporation) which is an oxymethylene/ethylene oxide copolymer were compared with wear properties of the same copolymer containing (1) 0.75 wt. % polyethylene glycol and 0.25 wt. % glyceryl monostearate; (2) wt. % dimethylsiloxane; and (3) 0.75 wt. % polyethylene glycol (PEG), 0.25 wt. % glyceryl monostearate (GMS), and 2 wt. % polydimethylsiloxane (PDMS).

A time to wear study for the four polymers against steel at 50 PSI and 300 FPM (feet per minute) was conducted on a Falex multi-specimen test machine manufactured by The Falex Corporation of Aurora, Ill. The machine is a thrust washer configuration in which the polymers were injection molded into wear discs and rotated against a wear base of C1018 carbon steel RC30. The test is a short term wear test which measures the time required to fail the wear specimen. Samples which are unfailed after 120 minutes are removed and classified as "unfailed". The conditions of this test (50 PSI and 300 FPM) are quite severe. The results are summarized in FIG. 1.

As can be seen, the time to wear failure measured for the polymer containing the antistatic agents polyethylene glycol and glyceryl monostearate showed only a slight improvement over the polyacetal copolymer without additives. As shown, the low wear copolymer containing 2 wt. % dimethylsiloxane failed after 60 minutes. The combination of polydimethylsiloxane and the antistatic additives unexpectedly results in extending the time to failure of the copolymer beyond the two hour time limit of the test.

What is claimed is:

1. A low wear polyacetal resin composition comprising an oxymethylene polymer containing effective amounts of an antistatic agent and a polydiorganosiloxane so as to increase the wear properties of said polymer.

2. The low wear polyacetal resin composition of claim 1 wherein said antistatic agent comprises a mixture of polyhydric fatty acid esters or ethers of polyhydric alcohols derived from polyhydric alcohols containing at least three hydroxyl groups and an ether or ester derivative of glycol.

3. The low wear polyacetal resin composition of claim 2 wherein said ether or ester derived from said polyhydric alcohol is present in amounts of about 0.1 to 1 wt. % relative to said polymer and said glycol ether or ester derivative is present in amounts of about 0.5 to 1.4 wt. %.

4. The low wear polyacetal resin composition of claim 1 wherein said polydiorganosiloxane is present in amounts of about 1.5-3 wt. %.

5. The low wear polyacetal resin composition of claim 3 wherein said polydiorganosiloxane is present in amounts of about 1.5-3 wt. %.

6. The low wear polyacetal resin composition of claim 1 wherein said polyacetal resin comprises a copolymer of oxymethylene units and oxyalkylene units derived from cyclic ethers having at least two adjacent carbon atoms.

7. A low wear polyacetal resin composition comprising an oxymethylene polymer containing effective amounts of an antistatic agent comprising a mixture of an ester or ether derivative of a polyhydric alcohol containing at least three hydroxyl groups and an ether or ester derivative of glycol to render said composition antistatic and a polydiorganosiloxane having the structural formula

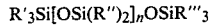

wherein R', R", R''' can be the same or different and selected from alkyl, phenyl, or substituted phenyl; n is an integer from 1 to 100; and said polydiorganosiloxane has a viscosity of from about 1,000 to 100,000 centistokes at 77° F. (25° C.), so as to increase the wear properties of said polymer.

8. The low wear polyacetal resin composition of claim 7 wherein said derivative of said polyhydric alcohol containing at least three hydroxyl groups is a polyol fatty acid ester.

9. The low wear polyacetal resin composition of claim 8 wherein said polyol fatty acid ester contains at least one free hydroxyl group.

10. The low wear polyacetal resin composition of claim 7 wherein said derivative of glycol is selected from polyethylene glycol, polypropylene glycol, and copolymers thereof.

11. The low wear polyacetal resin composition of claim 9 wherein said derivative of glycol is selected from polyethylene glycol, polypropylene glycol, and copolymers thereof.

12. The low wear polyacetal resin composition of claim 11 wherein said polyol fatty acid ester is present in amounts of about 0.1 to 1 wt. % relative to said polymer and said glycol derivative is present in amounts of about 0.5 to 1.4 wt. %.

13. The low wear polyacetal resin composition of claim 12 wherein said polyol fatty acid ester is present in amounts of about 0.1 to 0.4 wt. % and said glycol derivative is present in amounts of about 0.6 to 0.9 wt. % based on said polymer.

14. The low wear polyacetal resin composition of claim 7 wherein said polydiorganosiloxane is present in amounts of about 1.5-3 wt. % based on said polymer.

15. The low wear polyacetal resin composition of claim 14 wherein said polydiorganosiloxane is present in amounts of about 1.8-2.2 wt. % based on said polymer.

16. The low wear polyacetal resin composition of claim 12 wherein said polydiorganosiloxane is present in amounts of about 1.5-3 wt. % based on said polymer.

17. The low wear polyacetal resin composition of claim 13 wherein said polydiorganosiloxane is present in amounts of about 1.8-2.2 wt. % based on said polymer.

18. The low wear polyacetal resin composition of claim 7 wherein said polydiorganosiloxane is polydimethylsiloxane.

19. The low wear polyacetal resin composition of claim 11 wherein said polydiorganosiloxane is polydimethylsiloxane.

20. The low wear polyacetal resin composition of claim 19 wherein said polyol fatty acid ester comprises glyceryl monostearate and said glycol derivative is polyethylene glycol.

21. The low wear polyacetal resin composition of claim 20 wherein said glyceryl monostearate is present in an amount of 0.25 wt. % of said polymer, said polyethylene glycol is present in an amount of 0.75 wt. % of said polymer and said dimethylsiloxane is present in an amount of 2 wt. % of said polymer.

22. The low wear polyacetal resin composition of claim 7 wherein said polyacetal resin is a copolymer comprising oxymethylene units and oxyalkylene units derived from a cyclic ether having at least two adjacent carbon atoms.

23. A molded article formed from the composition of claim 1.

24. A molded article formed from the composition of claim 7.

25. A molded article formed from the composition of claim 19.

26. A molded article formed from the composition of claim 20.

* * * * *